April 30, 1940.   J. H. ROETHEL   2,199,347
FASTENING DEVICE
Filed Feb. 2, 1938
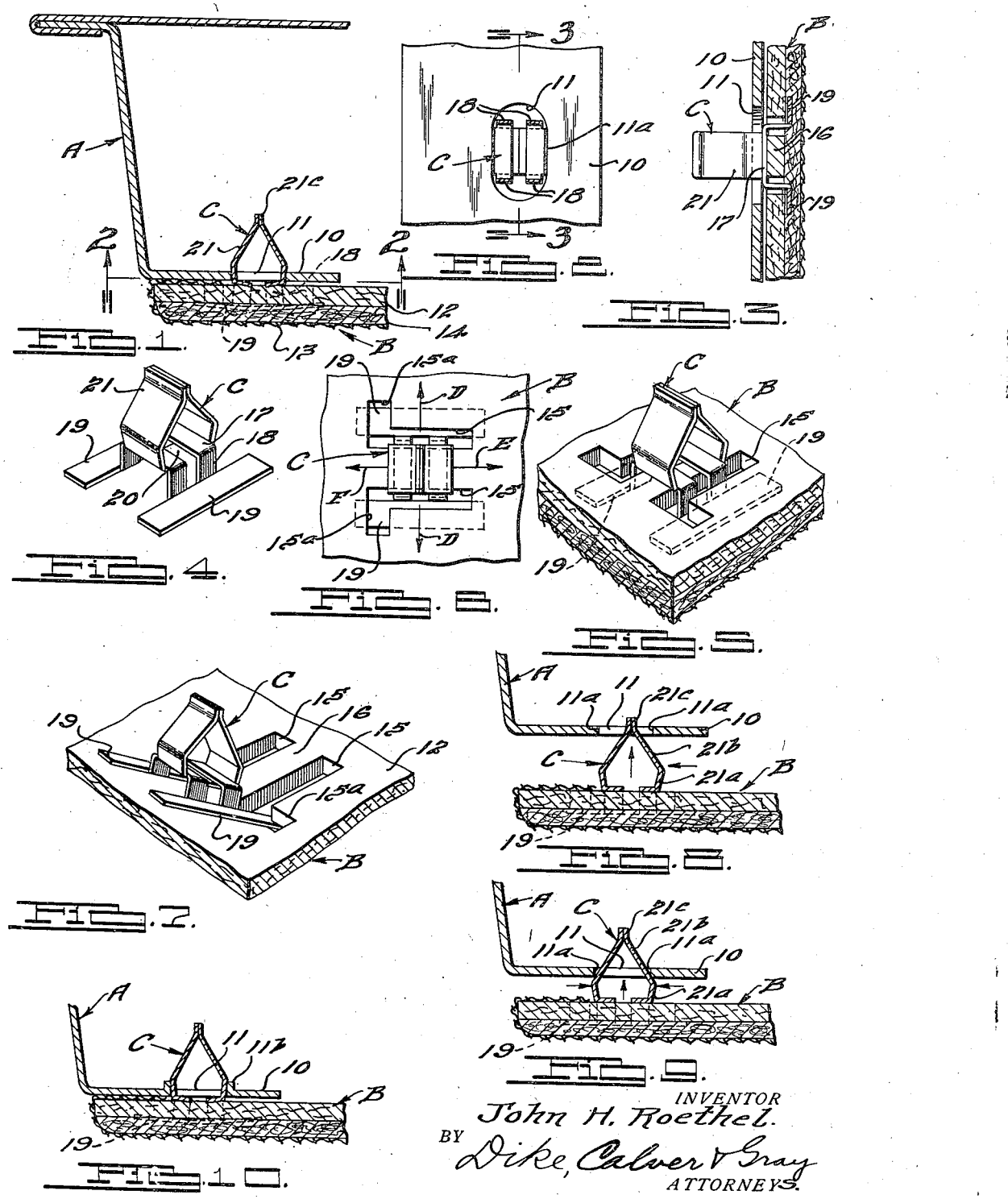

Patented Apr. 30, 1940

2,199,347

UNITED STATES PATENT OFFICE 2,199,347

FASTENING DEVICE

John H. Roethel, Detroit, Mich., assignor to Marvel Equipment Corporation, Detroit, Mich., a corporation of Michigan Application February 2, 1938, Serial No. 188,300

12 Claims. (Cl. 24—73)

This invention relates to fastening means for releasably connecting two members together face to face, such for example as a trim or finish panel and a support, and to the method and means of applying a fastener element to one of the members. The fastening means embodying the invention are capable of use in various relations, such as in connection with the application of finish trim to the interior of motor vehicle bodies, or for any use where a surface is to be covered by upholstery material or other fabric to conceal or cover the supporting medium or surface.

One of the objects of the invention is to provide an improved fastening means in which the elements thereof are preferably although not necessarily capable of being stamped or punched from sheet metal at relatively low cost, the construction being relatively simple and inexpensive and the cooperating elements being so constructed as to permit ease and efficiency in the assembly of parts and attachment of the members face to face.

Another object of the invention is to provide improved fastening means comprising a fastener element adjustably mounted on the support therefor, such as the foundation sheet of a trim panel or molding, the construction being such that any misalignment of the fastener element with respect to the aperture in a frame member in which the fastener is to be secured is automatically overcome upon forcing the fastener through the aperture into attaching position.

A further object is to provide an improved fastener element having spring gripping members capable of firmly gripping the side edges of an aperture into which the fastener is inserted and also having means effective to firmly grip or bind the base of the fastener against the foundation or supporting member for the fastener, whereby when the trim panel or other trim member is attached to a support the fastener will be firmly and tightly held against movement relatively to the foundation member as well as the support to which the panel is attached.

A further object of the invention is to provide a fastener means including a fastener element adapted to be inserted into preformed slots or openings in the foundation sheet, the improved construction being such that the fastener is capable of lateral adjusting movement on the foundation sheet and in the plane thereof to overcome misalignment of the fastener and its entering aperture in a fixed support due to manufacturing tolerances or inaccuracies.

Other objects of this invention will appear in the following description and appended claims, reference being had to the accompanying drawing forming a part of this specification wherein like reference characters designate corresponding parts in the several views.

Fig. 1 is a fragmentary horizontal section taken through a pillar or frame member of a motor vehicle door illustrating a trim panel and fastener element in attached position, an enlarged view of the latter being shown.

Fig. 2 is a section taken substantially through lines 2—2 of Fig. 1 looking in the direction of the arrows.

Fig. 3 is an enlarged section taken substantially through lines 3—3 of Fig. 2 looking in the direction of the arrows.

Fig. 4 is an enlarged perspective view of a fastener element.

Fig. 5 is an enlarged fragmentary view of a portion of a trim panel illustrating the fastener installed thereon.

Fig. 6 is a plan view of the structure shown in Fig. 5.

Fig. 7 is a perspective view somewhat similar to Fig. 5 but illustrating the method of installing the fastener element.

Figs. 8 and 9 are views somewhat similar to Fig. 1 but illustrating successive steps in the attachment of the trim panel and fastener to the support, this view particularly illustrating the automatic adjustment of the fastener to overcome misalignment of the cooperating parts.

Fig. 10 is a view similar to Fig. 1 but illustrating a slight modification in the construction of the aperture in the support within which the fastener is attached.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

As will be understood, the fastening means comprises cooperating elements carried by two members adapted to be releasably connected together face to face. Various kinds of members may be used and in the drawing these members, by way of example, are exemplified by a trim panel and a support of a vehicle body, such as the door or body framing thereof.

In the drawing A represents the pillar or frame member of a motor vehicle door having at the inner side of the door an inturned metal flange 10. It will be understood that the flanging 10 of the door frame usually extends along the sides and bottom thereof and is provided at suitable intervals with a series of apertures 11 punched in the metal of the flanging, the opposite side edges 11a of which are adapted to be engaged or gripped by the legs or prongs of a fastener element constructed in accordance with the present invention.

The inner face of the door A is adapted to be covered by a trim panel B which, as shown, may comprise a foundation or backing sheet 12 having its inner face covered by means of a trim fabric 13, there being a layer 14 of suitable padding or wadding material interposed between the inner face of the foundation sheet 12 and the trim fabric 13. It will be understood that the trim panel B is ordinarily shaped to fit against the inner face of the door and to conform to the configuration thereof. At predetermined spaced points corresponding approximately to the apertures 11 in the door frame the foundation sheet 12 is cut out by a punch operation to provide a pair of substantially L-shaped openings or slots 15 which are spaced apart and which have their leg portions of greatest length in substantial parallelism, see Fig. 7. The slots 15 are separated or spaced apart by an intervening strip or tongue 16 formed from the material of the panel. As will be explained hereinafter, the L-shaped openings or slots are of greater length than the width of the base portion of the fastener element and the bridge piece or tongue 16 is likewise of greater length than the width of said base portion and also narrower than the length of said base so as to permit adjustment in four directions of the fastener element relative to the panel to comensate for any variations in the relative location of the fastener and its entering aperture 11.

Referring particularly to Fig. 4, the fastener element C of the present embodiment of the invention comprises a base portion 17 which, as shown, is oblong. The base or body portion 17 at opposite ends thereof is turned downwardly to provide spaced abutments 18 and then turned outwardly to provide a pair of tongues or feet 19 which, as shown, extend at substantially right angles to the bridge piece or body portion 17 and lie in planes below and spaced from said body portion 17. Thus, the transverse bridge piece 17 is offset vertically from the flat elongated feet 19 and the bridge together with its down bent end abutments 18 is slotted from end to end at 20 thereby in effect separating the parts 17 and 18 into two relative yieldable bridge members connecting the parts 19.

The fastener element C is also provided with a pair of spaced upwardly extending spring prongs or legs 21 which are formed integrally from the metal of the base and are turned upwardly at an angle approaching a right angle. Thus, as more clearly shown in Fig. 8, the spring prongs comprise upwardly extending somewhat diverging gripping portions 21a and inwardly and upwardly converging portions 21b. These latter portions preferably terminate at their upper ends in parallel portions 21c which preferably lie in substantially abutting relation so as to provide an entering point for the fastener in the aperture 11.

The fastener element C is adapted to be applied to the foundation sheet or base 12 and snapped into place by inserting either of the ends of the feet 19 of the fastener into the short legs 15a of the spaced L-shaped slots 15. The fastener is then pushed through the slots 15a, 15 until the fastener has reached its position of Figs. 5 and 6 with the feet portions 19 thereof underlying the under or outer face of the foundation sheet 12 as clearly shown in dotted lines in Fig. 6. With the fastener in this position upon the panel it will be seen that the base or body portion 17 thereof loosely straddles the bridge or partition strip 16 of the foundation sheet and that the opposite ends of the feet 19 underlap the ends of the slots 15 or 15a, dependent upon the position of the fastener in the slots, and also underlap the outer edges of the long slots. By reason of the fact that the base portion 17 of the fastener has a length which is greater than the width of the section 16, which the portion 17 straddles, adjustment of the fastener in a direction longitudinally of the base 17, i. e., transversely with respect to the tongue section 16, is permitted. This is illustrated by the arrows D in Fig. 6. By reason of the fact that the slots 15 and 15a, as well as the tongue or partition 16, are longer than the transverse dimension or width of the fastener base or bridge piece 17, the fastener is permitted to slide laterally and lengthwise in the slots as illustrated by the arrows E in Fig. 6. Therefore, a four-way adjustment or variation of the position of the fastener relative to its supporting surface or member is permitted, thus allowing the panel and/or the fastener element to be shifted upon application to the supporting member A to accommodate for any variation in the relative location of the openings 11 and the fastener elements.

The depending abutments 18 of the fastener are of only slightly greater depth or height than the thickness of the panel board 12 so that when the fastener is applied to the board the feet 19 thereof will preferably lightly engage the outer or bottom face of the foundation sheet or board 12 and will lie substantially flush with said face thereby eliminating any substantial protuberance beneath the trim material, which is particularly undesirable in the event the padding layer 14 is omitted.

By reference to Fig. 5 the differential in the longitudinal and transverse dimensions of the base or body 17 of the fastener, the bridge section 16 of the foundation sheet and the slots or openings 15, 15a thereof will be apparent. This differential in the dimensions permits longitudinal and transverse adjustment in two directions at substantially right angles to one another of the fastener relative to the foundation sheet and in the plane thereof.

As best seen in Fig. 2 each slot or opening 11 formed in the support A is preferably elongated and is somewhat longer than the width of the fastener prongs or gripping portions 21a. Consequently, an additional adjustment of the fastener prongs 21 relative to the side edges 11a of the aperture along the length of said edges is permitted.

Figs. 8, 9 and 1 in order to illustrate steps in the assembly of the trim panel B to the support A. In this instance it should be particularly noted that the parts are shown with the entering point 21c of the fastener out of alignment or off-center with respect to the aperture 11, a condition which frequently prevails in practice. It will be seen that considerable variation in the location of the point 21c to the aperture is permissible, in other words a variation to an extent substantially equal to the width of the aperture 11 is possible while still permitting installation of the parts. As the panel B is applied to the support A, see Fig. 8, the leading point 21c of the fastener enters the aperture 11. The edges 11a of the aperture will simultaneously engage the converging spring portions 21b in the event the leading point 21c initially centers in the aperture. In the event as shown in Figs. 8 and 9, the leading point is off-center with respect to the aperture, one edge 11a (the righthand edge in Figs. 8 and 9) will first engage one side of the fastener 21 and as the fastener is thrust into the aperture the said edge 11a will force the fastener laterally in the direction of the horizontal arrow in Fig. 8 until the fastener is centered. Further movement of the fastener through the aperture, as shown in Fig. 9, will result in the opposed edges 11a compressing and springing inwardly the prongs 21b until the edges 11a are grippingly engaged by the portions 21a as seen in Fig. 1. As the fastener is forced home from the position of Fig. 9 to the position of Fig. 1, the resilient or spring prongs will be elongated due to the contact of the leading points 21c thereof and due to the fact that the preferred width of the aperture 11 between the side edges 11a thereof substantially corresponds to the distance between the bottom edges of the prongs or the width of the bridge portion 17. Moreover, as the prongs 21 are compressed when forced between the side edges 11a from the position of Fig. 9 to the position of Fig. 1 the upright gripping portions 21a will be tilted inwardly toward each other to a more nearly perpendicular position with respect to the base and since at this time the spring members 21 are loaded or under compression the portions 21a by their expansion effort will firmly and tightly grip or bind against the edges 11a.

It will also be noted that upon inward contraction of the prongs 21 in the direction of the horizontal arrow in Fig. 9, thereby tilting inwardly the portions 21a, the split portions of the bridge 17 will be tilted or bent up relatively to each other thereby bending or bowing the feet portions 19 causing them to bite into or grip tightly the face of the sheet 12, as seen in Fig. 1. In other words, compression of the spring prongs 21b between the edges 11a of the opening will distort the split portion 17, 18 and buckle or bow the portions 19 so as to bind them against the panel. As a consequence of the foregoing, it will be seen that the reaction effort of the spring prongs under compression will cause the upright gripping portions 21a to bind within the opposed edges 11a of the aperture and at the same time the feet portions 19 will be buckled or distorted to bind against the face of the supporting sheet 12. Hence, with the fastener and panel installed, as shown in Fig. 1, no substantial relative movement of any of the parts is possible, yet the panel may be readily detached from the support A by prying it loose.

The construction illustrated in Fig. 10 is substantially the same as that hereinbefore described with the exception that in this instance the aperture 11 in the flanging 10 of the support A is formed with in-struck tongues or lugs 11b along the opposed side edges thereof. When the fastener is inserted through the aperture the gripping portions 21a thereof will grip or bind against the inturned edges 11b of the aperture. The construction of the parts is otherwise identical and the mode of operation and functioning of the parts are the same as that hereinbefore described.

It will be understood that in one of the important aspects of the invention the fastener element may be detachably mounted upon its supporting member in other ways than herein illustrated.

It has been found in production that fibre foundation sheets or boards have a tendency to warp, shrink or expand under different conditions. Thus, even though the fasteners are applied accurately at points which normally would register with the openings or apertures in the supporting surface, it has often been necessary to remove the fasteners and insert them at different locations in their foundation sheet in order to compensate for variations due to shrinkage, expansion or warping of the sheet. In many instances where the fasteners do not line up with the apertures installation of the panel results in bending or tilting of the fasteners to such an extent as to cause breakage thereof, thereby necessitating replacements at considerable expense due to loss of time and duplication of labor. Such unnecessary operations have obviously caused delay in the assembly methods and in many instances, to avoid an unnecessary expenditure of time, entire panels have been discarded, thus materially increasing the cost of production by reason of such waste of materials and increase in labor expense. These difficulties have been overcome by the present invention as a result of which a fastener means embodying novel and desirable characteristics has been provided.

I claim:

1. In a fastener device, a base comprising two substantially parallel coplanar members, a bridge piece spanning and connecting said members, said bridge piece being in the form of a channel having a transverse web portion and down bent end portions integrally joined to said members, and a pair of spring prongs extending outwardly and integrally from the opposite more remote edges of said bridge piece.

2. In a fastener device, a base comprising two substantially parallel coplanar members, a bridge piece spanning and connecting said members, said bridge piece being in the form of a channel having a transverse web portion and down bent end portions integrally joined to said members, and a pair of spring prongs extending outwardly and integrally from the opposite more remote edges of said bridge piece, said bridge piece being slotted to provide relatively yieldable portions.

3. In a fastener device, a base comprising two substantially parallel coplanar members, a bridge piece spanning and connecting said members, said bridge piece being in the form of a channel having a transverse web portion and down bent end portions integrally joined to said members, and a pair of spring prongs extending outwardly and integrally from the opposite more remote edges of said bridge piece, said web portion and down bent end portions being split in a direction transverse to said members to provide relatively yieldable portions.

4. In a fastener device, a base comprising two substantially parallel coplanar members, a bridge piece spanning and connecting said members, said bridge piece being in the form of a channel having a transverse web portion and down bent end portions integrally joined to said members, and a pair of spring prongs extending outwardly and integrally from the opposite more remote edges of said bridge piece, said prongs comprising gripping portions extending in diverging relation and terminating in converging portions, the latter terminating in closely adjacent lead portions engageable upon compressing said prongs together.

5. In a fastener device, a base comprising a pair of spaced substantially parallel foot members adapted to engage against a face of a support when inserted through slots therein and installed in position, a split bridge piece spanning and integrally joining said foot members, and spring prongs extending outwardly and integrally from the bridge piece and compressible to bow said foot members.

6. A fastener device comprising two spaced base members, a split bridge piece spanning and integrally joining said members, a pair of compressible spring gripping members extended outwardly and integrally from said bridge piece.

7. A fastener device comprising two spaced base members, a split bridge piece spanning and integrally joining said members, and a pair of compressible spring gripping members extended outwardly and integrally from said bridge piece, said bridge piece being in the form of a channel.

8. A fastener device comprising two spaced substantially parallel base members, a pair of spaced relatively yieldable bridge pieces spanning and integrally joining said base members, and spring gripping members extended outwardly and integrally from the remote edges of said bridge pieces and compressible to bend said base members.

9. A fastener device comprising a pair of spaced spring base members, a pair of spaced spring bridge members connecting said base members integrally, and a pair of spring gripping members extended integrally from the bridge members, the gripping members being compressible to bend the bridge members and in turn bend the base members.

10. A fastener device comprising a pair of substantially coplanar spaced parallel base members, a split bridge member integrally connecting said base members, spring gripping means extended integrally from the bridge member, the latter being distortable to transversly bend said bridge member and in turn bend said base members.

11. A fastener device comprising a pair of spaced parallel base members, a split bridge member integrally connecting said base members, compressible spring gripping means extended integrally from the bridge member and adapted to bend said base members when compressed.

12. A fastener device comprising a one-piece generally H-shaped base including two substantially parallel coplanar members and a transverse bridge piece connecting said members and offset upwardly with respect thereto, and a pair of spring prongs extending outwardly and integrally from the opposite more remote edges of said bridge piece.

JOHN H. ROETHEL.